(12) United States Patent
Stent et al.

(10) Patent No.: US 9,690,854 B2
(45) Date of Patent: Jun. 27, 2017

(54) VOICE-ENABLED DIALOG INTERACTION WITH WEB PAGES

(71) Applicant: Nuance Communications, Inc., Burlington, MA (US)

(72) Inventors: Amanda Joy Stent, Chatham, NJ (US); Hyuckchul Jung, Florham Park, NJ (US); I. Dan Melamed, New York, NY (US); Nobal Bikram Niraula, Memphis, TN (US)

(73) Assignee: Nuance Communications, Inc., Burlington, MA (US)

( * ) Notice: Subject to any disclaimer, the term of this patent is extended or adjusted under 35 U.S.C. 154(b) by 219 days.

(21) Appl. No.: 14/092,033

(22) Filed: Nov. 27, 2013

(65) Prior Publication Data

US 2015/0149168 A1    May 28, 2015

(51) Int. Cl.
  *G10L 15/26*    (2006.01)
  *G06F 17/30*    (2006.01)
  *G06F 17/24*    (2006.01)

(52) U.S. Cl.
  CPC ...... *G06F 17/30861* (2013.01); *G06F 17/243* (2013.01); *G10L 15/26* (2013.01)

(58) Field of Classification Search
  CPC ....... G10L 15/30; G10L 15/285; G10L 15/32; G10L 2015/225; H04M 2250/74; H04M 2203/355; H04M 3/4938; G06F 17/3089; G06F 17/30905; G06F 2221/2149
  USPC ..... 704/235, 9, 276, 275; 719/328; 715/773, 715/234; 345/649, 536
  See application file for complete search history.

(56) References Cited

U.S. PATENT DOCUMENTS

| | | | |
|---|---|---|---|
| 6,101,473 A | 8/2000 | Scott et al. | |
| 6,456,974 B1 | 9/2002 | Baker et al. | |
| 6,587,822 B2 | 7/2003 | Brown et al. | |
| 6,704,807 B1* | 3/2004 | Mathur | G06F 9/4843 707/999.201 |
| 7,137,126 B1* | 11/2006 | Coffman | G06F 17/30899 704/200 |
| 7,158,779 B2 | 1/2007 | Hon et al. | |
| 7,200,555 B1* | 4/2007 | Ballard | G10L 15/22 704/235 |
| 7,366,766 B2 | 4/2008 | Kroeker et al. | |
| 8,024,422 B2 | 9/2011 | Kroeker et al. | |
| 8,060,371 B1 | 11/2011 | Schaedler et al. | |
| 8,099,289 B2* | 1/2012 | Mozer | G10L 15/30 704/270 |
| 8,224,656 B2* | 7/2012 | Scholz | G10L 15/30 704/251 |
| 8,462,917 B2 | 6/2013 | Bangalore et al. | |
| 8,510,412 B2 | 8/2013 | Kroeker et al. | |
| 8,543,397 B1* | 9/2013 | Nguyen | G06F 3/04883 704/235 |

(Continued)

OTHER PUBLICATIONS

Apple iOS 7—Siri http://www.apple.com/iphone/features/siri.html, accessed no later than Apr. 9, 2014, 3 pages.

(Continued)

*Primary Examiner* — Michael Colucci

(57) ABSTRACT

Voice enabled dialog with web pages is provided. An Internet address of a web page is received including an area with which a user of a client device can specify information. The web page is loaded using the received Internet address of the web page. A task structure of the web page is then extracted. An abstract representation of the web is then generated. A dialog script, based on the abstract representation of the web page is then provided. Spoken information received from the user is converted into text and the converted text is inserted into the area.

18 Claims, 13 Drawing Sheets

(56) References Cited

U.S. PATENT DOCUMENTS

| | | | |
|---|---|---|---|
| 8,543,404 B2 | 9/2013 | Moore et al. | |
| 8,838,455 B1* | 9/2014 | Fox | G10L 15/30 379/88.01 |
| 8,862,475 B2* | 10/2014 | Ativanichayaphong | G10L 15/265 704/270 |
| 2002/0178182 A1 | 11/2002 | Wang et al. | |
| 2006/0123220 A1* | 6/2006 | Colson | G06F 9/4401 713/1 |
| 2006/0190561 A1* | 8/2006 | Conboy | G06F 17/30864 709/217 |
| 2006/0192775 A1* | 8/2006 | Nicholson | A61F 4/00 345/211 |
| 2006/0235694 A1 | 10/2006 | Cross et al. | |
| 2006/0259462 A1* | 11/2006 | Timmons | G06F 17/30979 |
| 2006/0267857 A1* | 11/2006 | Zhang | G06F 3/14 345/1.1 |
| 2009/0254348 A1 | 10/2009 | Moore et al. | |
| 2011/0054899 A1 | 3/2011 | Phillips et al. | |
| 2011/0066634 A1* | 3/2011 | Phillips | G10L 15/22 707/769 |
| 2011/0144976 A1 | 6/2011 | Jain | |
| 2012/0311476 A1* | 12/2012 | Campbell | G06F 3/04886 715/773 |
| 2013/0033523 A1* | 2/2013 | Stovicek | G06F 17/2288 345/649 |
| 2013/0246179 A1* | 9/2013 | Shrock | G06Q 30/00 705/14.58 |
| 2013/0279744 A1* | 10/2013 | Ingrassia, Jr. | G06F 21/32 382/103 |
| 2014/0057610 A1* | 2/2014 | Olincy | H04M 3/42365 455/414.1 |
| 2014/0122057 A1* | 5/2014 | Chelba | G06F 17/276 704/9 |
| 2014/0365865 A1* | 12/2014 | Ivory | G06F 17/2247 715/234 |
| 2015/0116341 A1* | 4/2015 | Kenmochi | G09G 3/20 345/536 |

OTHER PUBLICATIONS

Nuance, Nina—the intelligent multichannel virtual assistant, http://www.nuance.com/meet-nina, accessed no later than Apr. 9, 2014, 8 pages.

GitHub alp82/abmash, https://github.com/alp82/abmash, accessed no later than Apr. 9, 2014, 5 pages.

Selenium WebDriver, http://seleniumhq.org/projects/webdriver/, accessed no later than Apr. 9, 2014.

Kai, Atsuhiko et al., "Usability of Browser-Based Pen-Touch/Speech User Interfaces for Form-Based Applications in Mobile Environment", Advances in Multimodal Interfaces—ICMI 2000, Third International Conference, Beijing, China, Oct. 14-16, 2000 Proceedings, pp. 549-556, 2000.

Honkala, Mikko et al., "Speech-enabled Web Forms", 5 pages, obtained no later than Oct. 4, 2013.

Bobrow, D. G. et al., "An Augmented State Transition Network Analysis Procedure", Proceedings of IJCAI, pp. 557-567, 1969.

Di Fabbrizio, G., et al., "Florence: A Dialogue Manager Framework for Spoken Dialogue Systems", Proceedings of INTERSPEECH 2004, $8^{th}$ International Conference on Spoken Language Processing, pp. 3065-3068, Oct. 4-8, 2004.

Dragut, E.C., "A Hierarchical Approach to Model Web Query Interfaces for Web Source Integration", VLDB, pp. 325-336, Aug. 24-28, 2009.

Allen, J. et al., "PLOW: A Collaborative Task Learning Agent", Association for the Advancement of Artificial Intelligence, pp. 1514-1519, 2007.

Mahmud, J., "Automated Construction of Web Accessibility Models from Transaction Click-streams", WWW 2009, pp. 871-880, Apr. 20-24, 2009.

Barbosa, L. et al., "SpeechForms: From Web to Speech and Back", INTERSPEECH, pp. 2121-2124, 2011.

Issar, S., "A Speech Interface for Forms on WWW", Proceedings of the $5^{th}$ European Conference on Speeech Communication and Technology, 4 pages, Sep. 1997.

Furche, T. et al., "Forms form Patterns: Resuable Form Understanding", WWW 2012, 10 pages, Apr. 16-20, 2012.

Khare, R., "Understanding Deep Web Search Interfaces: A Survey", SIGMOD Record, vol. 39, No. 1, pp. 33-40, Mar. 2010.

Stenback, J. et al., "Document Object Model (DOM) Level 2 HTML Specification", W3C Recommendation, 135 pages, Jan. 9, 2003.

Lowet, D. et al., "Co-Browsing Dynamic Web Pages", WWW 2009, pp. 941-950, Apr. 20-24, 2009.

Traum, D.R. et al., "The Information State Approach to Dialogue Management", Current and New Directions in Discourse and Dialogue, pp. 325-353, 2003.

* cited by examiner https://www.samplewebform.com

Find Great Deals on Hotels

Destination

Departure Date

Return Date

Adults    Children

Fig. 5A https://www.samplesearchengine.com

Search Me

Web

News

Images

Fig. 5B

```
...
<element>
    <label>Rooms:_100.0_409.19</label>
    <name>nbRooms</name>
    <id>nbRooms</id>
    <isVisible>true</isVisible>
    <type>select</type>
    <location>100,432</location>
    <text>1 2 3 4</text>
    <help>null</help>
    <tabIndex>null</tabIndex>
    <values>
        <value>*1-1</value>
        <value>2-2</value>
        <value>3-3</value>
        <value>4-4</value>
    </values>
    <isSelected>false</isSelected>
</element>
...
```

FIG. 10A

```
...
<transition name="t1" from="A"
    to="S1" else="false">
    <conditions>
        <cond oper="ne"
    expr1="$currentSlot"
    expr2="$totalSlots"/>
    </conditions>
    <actions>
        <action>slot_prompt</action>
    </actions>
</transition>
...
<state name="S1" pause="true"
    final="false">
    <exitstate>
        <set
    name="$slotVals[$currentSlot]"
    expr="$result"/>
            <increment
    var="currentSlot"/>
    </exitstate>
</state>
...
```

FIG. 10B

VOICE-ENABLED DIALOG INTERACTION WITH WEB PAGES

BACKGROUND

The present disclosure relates to the field of communications services. More particularly, the present disclosure relates to providing voice-enabled dialog flows that allow users to populate web forms and make web form selections via voice input.

BACKGROUND INFORMATION

Web forms are used to complete many common tasks on the Internet, including checking the weather, ordering food, booking flights, etc. However, completing web forms can be inconvenient or difficult, especially with a device having a small display or input area, or for persons with physical and/or visual impairment.

BRIEF DESCRIPTION OF THE DRAWINGS

FIG. 5A is an exemplary sample web form, according to an aspect of the present disclosure;

FIG. 5B is another exemplary sample web form, according to an aspect of the present disclosure;

FIG. 10A is an exemplary extensible markup language fragment for information for voice-enabled dialog interaction with web pages, according to an aspect of the present disclosure;

FIG. 10B is an exemplary extensible markup language fragment for voice-enabled dialog interaction with web pages, according to an aspect of the present disclosure.

DETAILED DESCRIPTION

Figure 1:
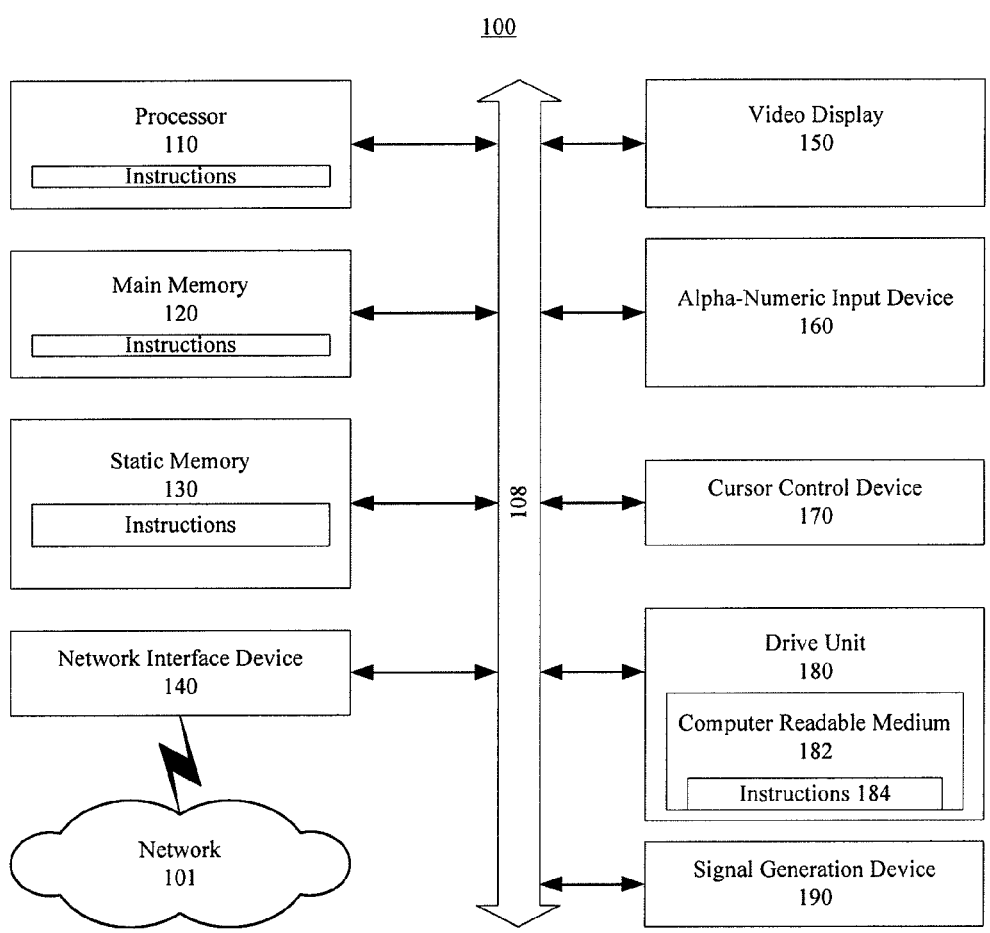
FIG. 1 shows an exemplary general computer system that includes a set of instructions for providing voice-enabled dialog interaction with web pages.

In view of the foregoing, the present disclosure, through one or more of its various aspects, embodiments and/or specific features or sub-components, is thus intended to bring out one or more of the advantages as specifically noted below. It should be noted that the similar components are designated by similar reference numerals. Although similar components are illustrated in different drawings, a description of each has not been repeated.

According to one aspect, the present disclosure includes a method of enabling voice interaction with a web page. The method includes receiving, at a processor, an Internet address of the web page, the web page including an area with which a user of a client device can specify information, loading the web page using the Internet address, extracting a task structure of the web page, generating an abstract representation of the web page, and providing a dialog script based on the abstract representation to provide voice interaction with the user. The spoken information of the user is converted into text and text is inserted into the area. The method may further include extracting forms, form constraints, and dependencies from the web page using a browser object model and a document object model. Still further, the method may include determining that the client device does not have an alphabetic input device. Additionally, the method may include generating a browser object model of the web page, in which the browser object model includes a state of hypertext markup (HTML) elements as the HTML elements would appear in a web browser. Further, the method may include generating a document object model of the web page, in which the document object model includes a tree of HTML elements. The method may also include detecting that the user of the client device prefers to specify information on the web page by voice. In addition, the method may include determining that the client device is a portable communications device, in which the determining is based upon a received user agent string in a hypertext transfer protocol (HTTP) address header received with the Internet address.

According to another aspect, the present disclosure provides a system for enabling voice interaction with a web page. The system includes a processor and a memory that stores executable instructions that, when executed by the processor, cause the processor to perform receiving an Internet address of the web page, the web page including an area with which a user of a client device can specify information, loading the web page using the Internet address, extracting a task structure of the web page, generating an abstract representation of the web page, and providing a dialog script based on the abstract representation to provide voice interaction with the user. The spoken information of the user is converted into text and the text is inserted into the area.

According to another aspect, the present disclosure provides a tangible computer readable storage medium encoded with an executable computer program that enables voice interaction with a web page and that, when executed by a processor, causes the processor to perform operations, including receiving, at a processor, an Internet address of the web page, the web page including an area with which a user of a client device can specify information, loading the web page using the Internet address, extracting a task structure of the web page, generating an abstract representation of the web page, and providing a dialog script based on the abstract representation to provide voice interaction with the user. The spoken information of the user is converted into text and text is inserted into the area. The operations may further include extracting forms, form constraints, and dependencies from the web page using a browser object model and a document object model. Additionally, the operations may further include determining that the client device does not have an alphabetic input device. Still further, the operations may include generating a browser object model of the web page, in which the browser object model includes a state of HTML elements as the HTML elements would appear in a web browser. The operations may include generating a document object model of the web page. The operations may also include detecting that the user of the client device prefers to specify information on the web page by voice. In addition, the operations may include determining that the client device is a portable communications device, in which the determining is based upon a received user agent string in an HTTP address header received with the Internet address.

The present disclosure provides voice-enabled dialog interaction with web pages, without requiring any re-authoring or modification of the web pages. Rather, the solution includes automatically processing web pages to generate web page voice dialog flows used to interact with users of the web pages. As defined herein, web pages include but are not limited to web forms, HTML forms, win forms, HTML tables, HTML calendars, and other online pages configured to accept user input in one or more fields, fillable areas, and/or input areas of a web page or Internet document. Additionally, as used herein, a fillable area includes but is not limited to a text box, a text area, a radio button, a check box, a select from list, a drop down list, a submit buttons, a reset button, a clear button, and other presented items on a web page in which a user may enter information or make a selection, for example, an area with which a user of a client device can specify information.

FIG. 1 is an illustrative embodiment of a general computer system, on which integration of speech-enabled dialog flows into web pages can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a touchscreen or keyboard, and a cursor control device 170, such as a mouse or trackball. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 106, and/or within the processor 110 during execution by the computer system 100. The main memory 120 and the processor 110 also may include computer-readable media.

As used herein, the term processor shall include multiple processors, which could include distributed processors or parallel processors in a single machine or multiple machines. Further, the processor 110 can be used in supporting a virtual processing environment. Additionally, the processor 110 could include a state machine, application specific integrated circuit (ASIC), programmable gate array (PGA) including a field PGA, or state machine. When the processor 110 executes instructions to perform operations, this could include the processor performing the operations directly and/or facilitating, directing, or cooperating with another device or component to perform the operations.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
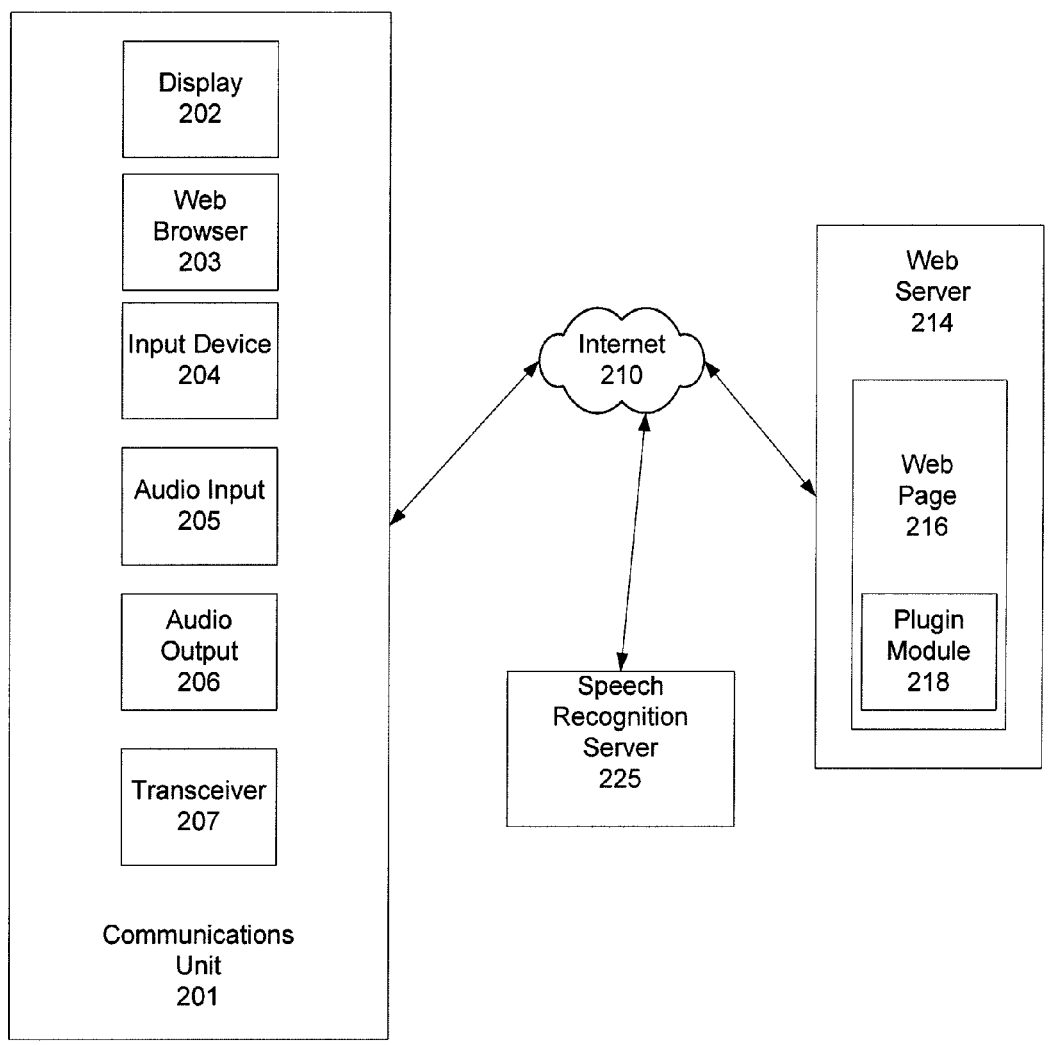
FIG. 2 is an exemplary network schematic for voice-enabled dialog interaction with web pages, according to an aspect of the present disclosure.

FIG. 2 illustrates an exemplary network schematic with respect to one aspect of the present disclosure. The schematic includes a communications unit 201 having a display 202, a web browser 203, an input device 204, an audio input 205, an audio output 206, and a transceiver 207. Other necessary hardware and software, including that required for communications over networks including the Internet, is also understood to be included. The communications unit 201 (i.e., client device) can by any type of device, including a client device, having a display such as such as a PC, a tablet PC, an STB, a PDA, a mobile device, a GPS device, a palmtop computer, a laptop computer, a desktop computer, a wireless telephone, a land-line telephone, a smart TV, a camera, a watch, a smart watch, smart glasses, a scanner, a facsimile machine, a printer, a pager, a personal trusted device, or a web appliance. The display 202 can be any type of display capable of displaying documents and images, such as web documents and web forms, received from sources including the web server 214. Although the display is depicted as an integral component of communications unit 201, the display 202 can be connected to the communications unit 201 by a hardwired or wireless connection. The web browser 203 can be any browser configured to retrieve, present, and browse documents on the Internet 210. The input device 204 can be, for example, a keypad, keyboard, or mouse. Further, the input device 204 may be displayed on the display 202 or may be a physically distinct unit. The audio input 205 can be a microphone for receiving audible information. The audio output 206 can be a speaker for producing audible information. Both the audio input 205 and the audio output 206 can be integral components of the communications unit 201 or can be connected to the communications unit 201 by a hardwired or wireless connection. The transceiver 207 can be any type of transceiver adapted to allow the communications unit 201 to communicate over networks including the Internet 210.

The network also includes the Internet 210, a web server 214, and a speech recognition server 225. The web server 214 can be any type of hardware or application configured to deliver web content over the Internet 210 to a user of the communications unit 201. That is, a user of the communications unit 201 selects a web page on the Internet using the web browser 203 of the communications unit 201. The web browser 203 then sends an HTTP request for the particular selected web page 216 to the web server 214. The web server 214 returns the requested web page 216 to the transceiver 207 of the communications device 201. The web page 216 includes a plugin module 218 embedded in the web page 216, for example, by the web developer or developer of the web page 216. When the web page 216 is accessed, the plugin module 218 is loaded, thus injecting its script into the web page 216, which builds the web dialog, as will be discussed in greater detail below. An exemplary plugin module 218 is written in the JavaScript™ programming language.

The speech recognition server 225 includes the necessary grammars to recognize audio input signals received from the audio input 205 and convert the audio signals into text. Additionally, the speech recognition server 225 includes a gateway (not shown) that couples the speech recognition server 225 to the Internet or other network. Speech can be transmitted between the speech recognition server 225 over the Internet via a voice over internet protocol (VoIP) channel, for example, using a session initiation protocol (SIP) or suitable alternative.

The speech recognition server 225 may include a signal processor or other processors and modules adapted to extract, identify and/or determine words, phrases, language, or sound patterns from a signal. Exemplary speech recognition techniques include those based on hidden Markov models, dynamic programming, neural networks, Gaussian mixture model, machine learning algorithm, maximum entropy model, and support vector machine model.

In this embodiment, spoken text is filled into an appropriate input area, or a user selection is entered, on a web form of the web page displayed on the web browser 203. The speech recognition server 225 may also optionally convert text and user selections from the displayed web page 216 on the web browser 203 into audio signals, which are outputted through audio output 206. Instead of an external speech recognition server 225, the functionalities of a speech recognition server can be included in the communications unit 201.

The embedded plugin module 218, when injected into the web page and loaded by the web browser 203, notifies the user that the web page 216 can be voice enabled. For example, as soon as the web page 216 is loaded by the web browser 203, an icon is displayed on the web page 216, which upon selection by the user, will provide voice-enabled voice dialog interaction with the web page 216. Alternatively, instead of an icon, an audible prompt can be provided to the user, at which time the user could supply an appropriate response to enable voice interaction with the web page 216.

Once the user supplies an appropriate response that they wish to interact with the web page 216 with spoken dialog by, for example, selecting the aforementioned icon, the injected script processes the web page 216 including identifying fillable forms and other fields, as will be described in greater detail below, to allow voice-enabled voice dialog interaction with the web page 216. Additionally, scripting in the plugin module 218 can alter the color, font, highlighting, text, and/or fillable areas, in addition to or in lieu of a traditional cursor.

A speech recognition application of the communications unit 201 or an external speech recognition processor of the speech recognition server 225 then reads the name of the appropriate fields to the user, as controlled by the dialog manager (as will be discussed below) so that the user can populate the web page 216. That is, when the user provides spoken words, the applicable speech recognition application converts the speech into text, which is then inserted into the appropriate field of the web form. Depending upon the web form, the user's spoken words may be used to populate areas other than text boxes, including, but not limited to a radio button, or a check box, drop down list, selection of a hyperlink, etc.

As each field or form element in the web form is populated with the converted speech spoken by the user, the dialog manager, moves the cursor to the next appropriate field or form element. For example, if a user is on a web page to check on flights, the dialog manager would instruct that an audio prompt be provided to the user to ask the user to provide a departure date of travel. When the user verbally provides the date of travel, the spoken information is converted into text and populated in the date field, or calendar form element, in the appropriate format. Then, the dialog manager can instruct that an audio prompt be provided to the user as to the destination, number of adults, number of children, return date, etc. The specific audio prompts and precise order of the prompts is determined when the web page 216 is processed by the plugin module 218.

Alternatively, after completing a particular field in the web page 216, the user can provide a verbal command such as "next", which is converted by the speech recognition server 225 and interpreted by the generated web dialog in the processed web page 216 to move the cursor, and any altering of the color, font, highlighting, text, and/or fillable area, to the next field of the web form. Alternatively, the user can enter a command on the input device 204, or a verbal command via audio input 205, to instruct that the cursor be moved to the next field of the web form.

According to user preference, via a suitable user selectable option, when the web form is completely populated, the speech recognition server 225 converts the filled text into speech which is output to the user via audio output 206. That is, the user can elect to have all of information input on the web page read back. In this fashion, the user can then listen to all of the filled text and selections, to determine whether any text needs to be modified and/or re-entered. If so, the user can provide a verbal command via the audio input 205 such as the name of the field, for example, "name", "date", "address", "account number", etc., requiring modification and/or reentry. Alternatively, the user can enter a command on the input device 204 to command that the cursor be moved to the desired field of the web form. Then, when the cursor, and any altering of the color, font, highlighting, text, and/or finable area, are on the appropriate field, the user can request that an entry or selection be deleted, so that a new entry or selection can be populated, in the manner described herein. Any information populated in the web page 216 is submitted to the web server 214 for processing.

Figure 3:
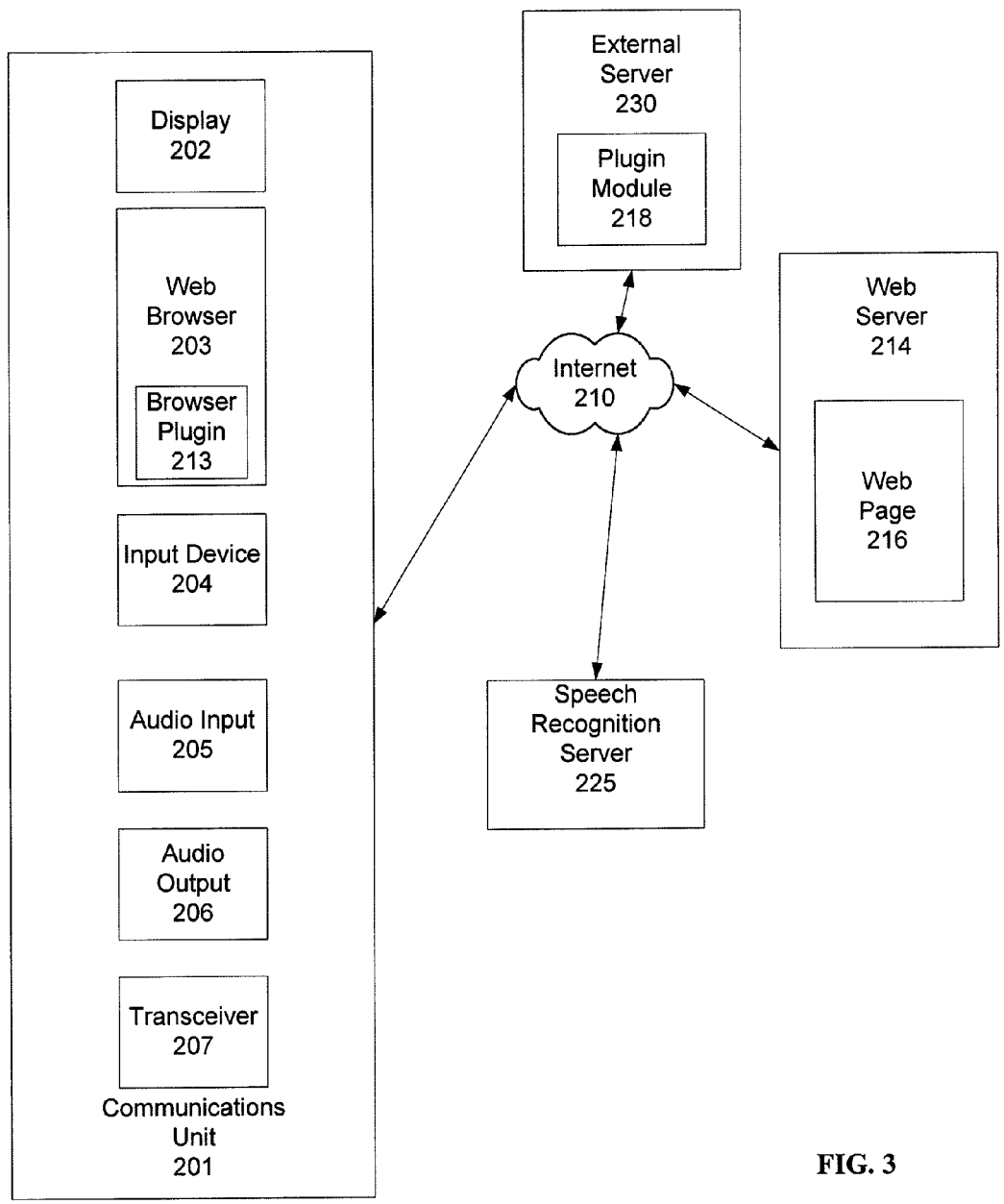
FIG. 3 is another exemplary network schematic for voice-enabled dialog interaction with web pages, according to an aspect of the present disclosure.

FIG. 3 illustrates another embodiment of the present disclosure. In the embodiment shown in FIG. 3, the communications unit 201 is similar to that described with respect to FIG. 2, with the primary differences from the discussion of FIG. 2 being discussed as follows. In this embodiment, a browser plugin 213 (e.g., a module) is installed in the web browser 203 by or on behalf of the user. The browser plugin 213 is a browser dependent module written in any suitable programming language, such as HTML and JavaScript™. Then, when the user subsequently requests a web page 216, the web browser 203 sends the uniform resource locator (URL) of the selected web page 216 to the external sever 230. In this regard, the owner or operator of the web server 214 may have a prearranged agreement with the owner or operator of the external server 230 with respect to the injection of script into the web page 216 and the processing of the requested web pages, including building and/or providing web page voice dialog. The external server 230 injects scripts of plugin module 218 into the web page, embedding script (e.g., JavaScript™) modules in the web page 216. The external server 230 then sends the web page 216, with the embedded script modules, back to the web browser 203 for display on the display 202, allowing the user to interact with the web page via voice-enabled voice dialog interaction, as discussed above with respect to FIG. 2.

Alternatively, when the user subsequently requests a web page 216, the web browser 203 send the HTTP request of the selected web page 216 to the web server 214. At the same time, the browser plugin 213 also sends the URL of the selected web page 216 to the external server 230. The plugin module 218 is then injected into the web page 216 to provide voice-enabled dialog interaction. In this alternative arrangement, the owner or operator of the web server 214 does not necessarily have to have an agreement with the owner or operator of the external server 230.

Regardless of which of the two arrangements are employed, the injected script processes the web page 216 including identifying fillable forms and other fields, as will be described in greater detail below, to allow voice-enabled voice dialog interaction with the web page 216. The remaining features and functionalities with respect to interacting with the web page via voice-enabled voice dialog interaction are similar to that described with respect to FIG. 2, including the use of the aforementioned speech recognition techniques.

Figure 4:
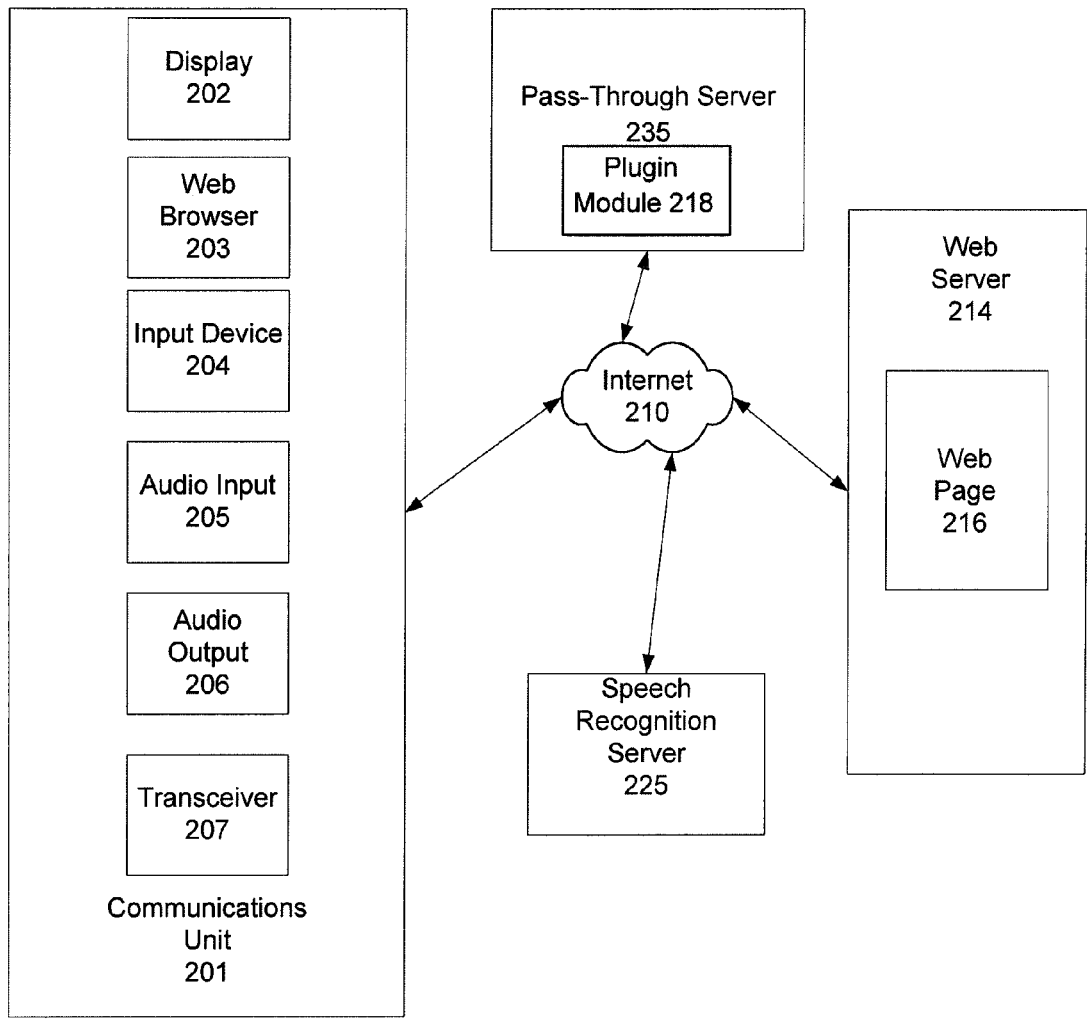
FIG. 4 is another exemplary network schematic for voice-enabled dialog interaction with web pages, according to an aspect of the present disclosure.

FIG. 4 illustrates another embodiment of the present disclosure. In the embodiment shown in FIG. 4, the communications unit 201 is similar to that described with respect to FIGS. 2 and 3, with the primary differences from the discussion of FIG. 2 being discussed as follows. When the user requests a web page 216, the web page 216 is loaded not through the web server 214, but through a pass-through server 235. The pass-through server 235 loads the web page 216 from the web server 214, injects the script (e.g., JavaScript™) modules into the web page 216 and sends the web page 216, with the embedded script modules, back to the web browser 203 for display on the display 202, allowing the user to interact with the web page via voice-enabled voice dialog interaction as discussed above with respect to FIG. 2. That is, the injected script processes the web page 216 including identifying fillable forms and other fields, as will be described in greater detail below, to allow voice-enabled voice dialog interaction with the web page 216. In one scenario, the request for the web page 216 is sent directly to the pass-through server 235. However, in another scenario, the web server 214 receives the request for the web page 216 and redirects the request for the web page 216 to the pass-through server 235. In this embodiment, the owner or operator of the web server 214 may have a prearranged agreement with the owner or operator of the pass-through server 235 with respect to the processing of the requested web pages, including building and/or providing web page voice dialog. The remaining features and functionalities with respect to interacting with the web page via voice-enabled voice dialog interaction are similar to that described with respect to FIG. 2 and FIG. 3, including the use of the aforementioned speech recognition techniques.

With respect to the embodiments illustrated in FIGS. 2, 3, and 4, when the communications unit 201 requests the web page 216, the user agent string in the HTTP request header identifies the communications unit 201 based upon the specific device of the communications unit 201. For example, the communications unit 201 may be determined by the user agent string to be a smartphone or other portable communications device, which typically have small displays, or a device lacking an alphabetic input device. Alternatively, the plugin module 218 can also detect the client device type by querying the web browser 203. In this case, the script in the plugin module 218 automatically activates the procedure to process the web page 216 and build the web page voice dialog, if it determines that the communications unit 201 has a small display or lacks an alphabetic input device.

Alternatively, the user can enable voice interaction with the web page 216, as discussed above with respect to FIG. 2. That is, when the plugin module 218 is injected into the web page and loaded by the web browser 203, the user is notified that the web page 216 can be voice enabled to allow voice interaction with the web page 216. For example, as soon as the web page 216 is loaded by the web browser 203, an icon is displayed on the web page 216, which upon selection by the user, will provide voice-enabled voice dialog interaction with the web page 216, by processing the web page 216 in a manner discussed below. Alternatively, instead of an icon, an audible prompt can be provided to the user, at which time the user could supply an appropriate response to enable voice interaction with the web page 216.

Figure 5C:
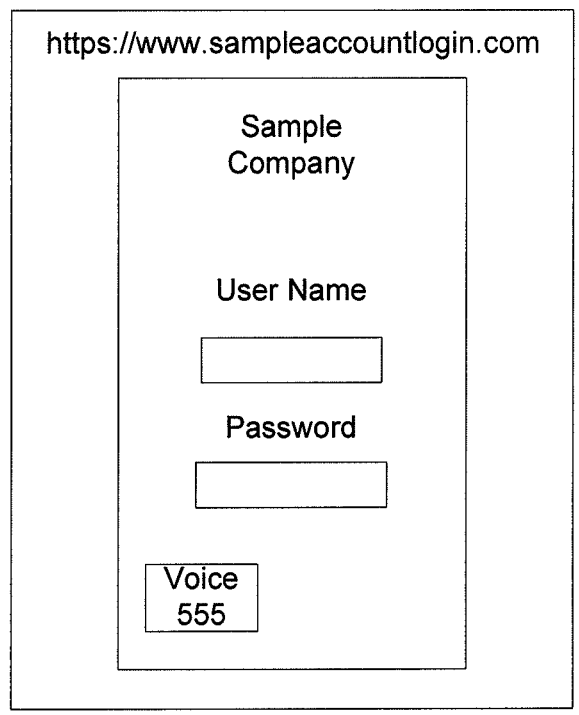
FIG. 5C is another exemplary sample web for, according to an aspect of the present disclosure.

FIGS. 5A-5C illustrate exemplary sample web forms that may be filled with the interactive web page voice dialog discussed herein. More specifically, FIG. 5A illustrates an exemplary travel web form to which a user may navigate using communications unit 201 to find hotel rates for a given destination, departure date, return date, and number of guests. FIG. 5B illustrates an exemplary search engine web form to which a user may navigate using communications unit 201 to search the Internet for web content, news, and/or images. FIG. 5C illustrates an exemplary company account login web form to which a user may navigate using communications unit 201 to access an account associated with, for example, a bank of a financial institution, an insurance company, a utility company, online retailer, etc. Of course, other types of web pages and web forms fall within the purview of the present disclosure, including but not limited to shopping, gaming, data storage, etc.

Additionally, the web form of FIG. 5C includes a voice icon, button, or other indicia 555 that is sent displayed on the web page 216, as discussed with respect to FIG. 2, The user may select the icon or indicia 555 to activate the voice-enabled dialog interaction with the web page 216. As an example, the voice icon 555 may be a push-to-talk (PTT) button, which the plugin module would cause to be displayed on the display 202, as discussed above. In any event, activation of voice enablement by the user would cause the web page to be processed in the manner discussed herein.

Figure 6:
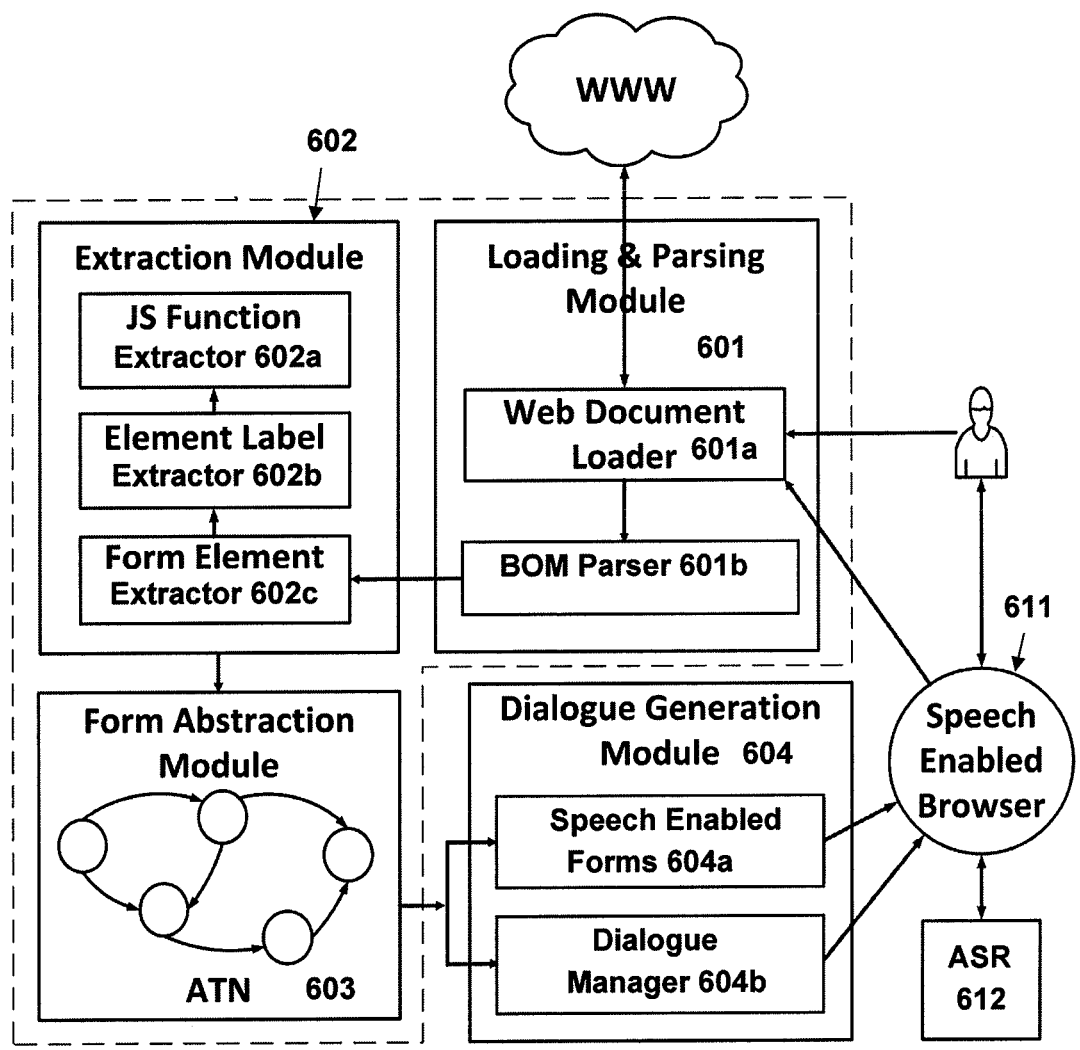
FIG. 6 is an exemplary architecture for voice-enabled dialog interaction with web pages, according to an aspect of the present disclosure.

FIG. 6 illustrates an exemplary architecture by which the interactive dialog for interactive speech operates. The architecture includes a loading and parsing module 601 having a web document loader 601a and a browser object model (BOM) parser 601b, an extraction module 602 having a JavaScript™ (JS) function extractor 602a, an element label extractor 602b, and a form element extractor 602c, a form abstraction module 603, and a dialog generation module 604 having speech enabled forms 604a and a dialog manager 604b. The architecture also includes a speech enabled browser 611 and an automatic speech recognizing server 612.

The loading and parsing module 601 of the web browser 203 downloads the web page 216 from the received Internet address (or URL) and parses the web page 216. The parsing process generates a document object model (DOM) and a BOM of the web page 216. The DOM includes a tree of HTML elements and the BOM includes the true state of HTML elements as they would appear in a browser window. The scripting in the plugin module 218 interacts with the web browser 203 to access the DOM and BOM information.

The extraction module 602 extracts forms and form elements from the web page 216. More specifically, the extraction module 602 extracts both static and dynamically generated form elements. That is, static form elements include those that are always present in the web page 216, while dynamically generated form elements include those that appear as a result of user input. The extraction module 602 also identifies element labels, collects values and help messages associated with form elements, and finds the relationships (i.e., ordering, value constraints, and dependencies) between form elements.

The form abstraction module 603 expresses form content. In one example, the form content is expressed as an augmented transition network (ATN), i.e., an abstract representation, which includes states and transitions. For example, states represent form elements and transitions represent possible user actions.

The dialog generation module 604 generates dialog flows for completing the web forms using, for example, using the corresponding ATNs. Dialog manager 604b rewrites ATNs into an extensible markup based language (XML) document to represent spoken dialog flows. The XML-based language can be proprietary to a company providing the plugin module 218, the web server 214, or external server 230. The XML document includes states that can contain variables and other metadata, transitions, conditions on states, and global variables or registers. Current input and local context are used to control the interaction flow. It is noted that each state can also execute operations while entering or exiting the state, which can be used to invoke other networks or sub-dialogs, return control to a previous dialog, or affect the task or global state (e.g., perform a database lookup).

Figure 7A:
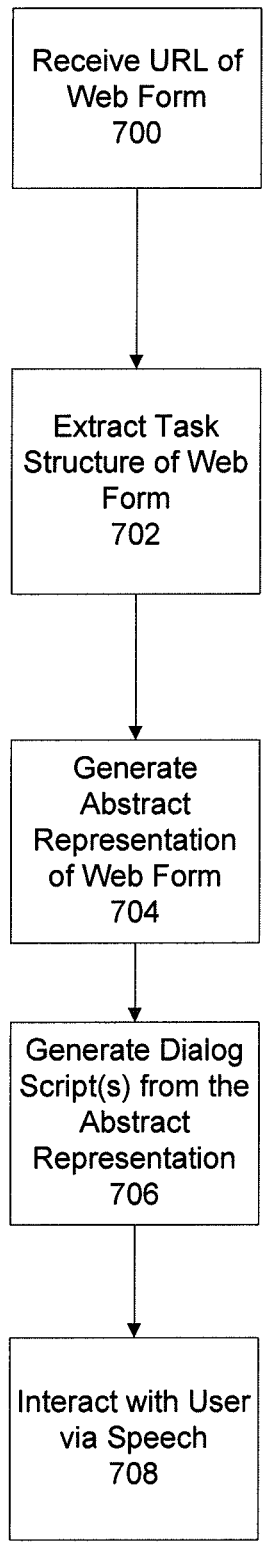
FIG. 7A is an exemplary flowchart diagram for voice-enabled dialog interaction with web pages, according to an aspect of the present disclosure.

FIG. 7A is an exemplary flowchart diagram according to an aspect of the present disclosure. At step 700, a URL or Internet address of a web page 216 having a Tillable area such as a web form is received by the loading parsing module 601. The extraction module 602 extracts the task structure of the web form at step 702.

More specifically, all of the forms in the web page 216 are first extracted. That is, a form typically contains elements such as a text box, a text area, a radio button, a check box, a select from list, a drop down list, a submit button, a reset buttons a clear button, and a hyperlinks. Of course, more than one of each element may be provided for a given form. Then, once the forms in the web page 216 are extracted, form elements are extracted corresponding to each of the forms. In this regard, form elements can be visible or invisible. That is, invisible elements are used to hold user information and preferences, as well as information that is computed automatically. A form can also contain events that can activate or deactivate other form elements. The visual and layout information associated with each form element is also obtained and stored, including the visibility, the absolute location, the location relative to other form elements, the font, the size, and the color. Then, labels are extracted for input form elements. That is, visual and layout features are used to associate input form elements and labels. For each form element, default values, possible values and help messages are also extracted. Additionally, the browser order of form elements, also known as the tab order, is also stored.

In order to achieve accurate form element labeling, looking at the for attribute (if used by the web developer) of the HTML <label> tag is first attempted. If the for attribute is not used or the label is otherwise not obtained, then visual information from the BOM is used to predict input form element labels. Since web forms are optimized for visual interaction through particular browsers, the HTML source captures the static content of the web page, but may not reflect web page layout and appearance or dynamic page content. Regardless of whether server side scripts or client side scripts are used to generate page content, web form elements are eventually displayed to the user when the web page 216 is loaded in the web browser 203. For this reason, the web browser's internal representation (i.e., the BOM) contains the most accurate and up to date information about the visual appearance and dynamic content of the web page.

Figure 8:
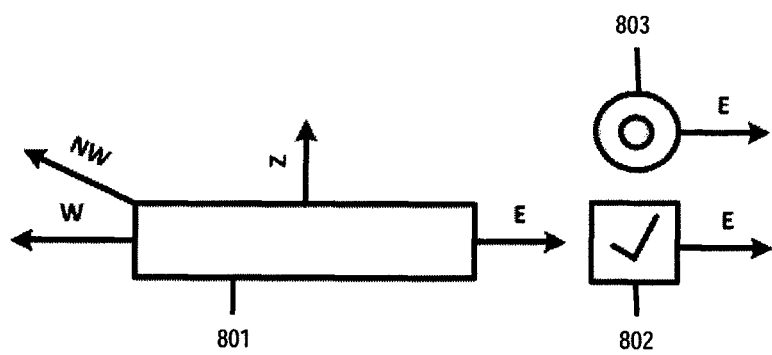
FIG. 8 is an exemplary schematic of heuristics for browser object model based form labeling for voice-enabled dialog interaction with web pages, according to an aspect of the present disclosure.

The BOM is used to associate text labels with the input form elements. Visual text elements around an input form element are potential candidates for its label. The labels corresponding to a text box, text area, and select form elements are typically located either to the north, west, or north-west of the input form element, whereas labels corresponding to a check boxes and radio buttons are normally located to the east. The heuristics can be seen in FIG. 8. That is, FIG. 8 illustrates exemplary heuristics for BOM based form labeling, including a text box 801, a check box 802 and a radio button 803. The possible locations (i.e., heuristics) associated with the text box 801 are N for north, W for west, and NW for northwest. The possible location (i.e., heuristic) for the check box 802 and the radio button is E for east. Thus, to each input form element are assigned the visible text elements closest to the input form element, using the relative location (left, right, etc.) as a tie breaker.

The value constraints and dependencies between form elements are also determined and stored. For example, in searching for a car, the possible models depend on the make. In booking flights, the return date filed is only relevant if the user is interested in a round trip flight.

The two primary ways in which input form elements influence each other are value constraints and dependencies. Value constraints are when the partial value provided for one form element changes the possible values of other input form elements. For example, starting to type in a text field may cause a drop down list of possible values for that text field to appear, and to change with additional typed input (e.g., selecting the make of a car from a list of makes in a car reservation form may change the values for the model field). Dependencies are when additional form elements appear, or become visible, based on user input; for example, selecting "round trip" in a flight booking form may cause a return date/time field to appear. If form element values are listed in the web form, then they are stored with the form element. Additionally, interactions with web form elements can also be simulated (e.g., "type" into text fields or "select" check boxes and radio buttons). Then, the web page 216 can be scanned to ascertain whether the interactions caused any changes in the BOM for the web page 216. If so, the value constraints or dependencies are stored in the abstract or ATN representation of the task. Such constraints can be stored so that future requests for the same website can utilize the constraints.

Figure 9A:
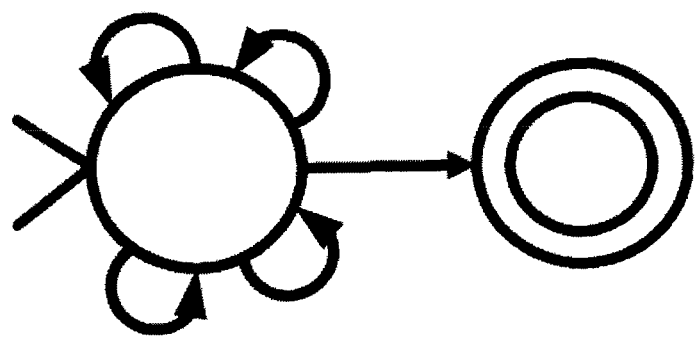
FIG. 9A is an exemplary schematic of two state task representation for voice-enabled dialog interaction with web pages, according to an aspect of the present disclosure.
Figure 9B:
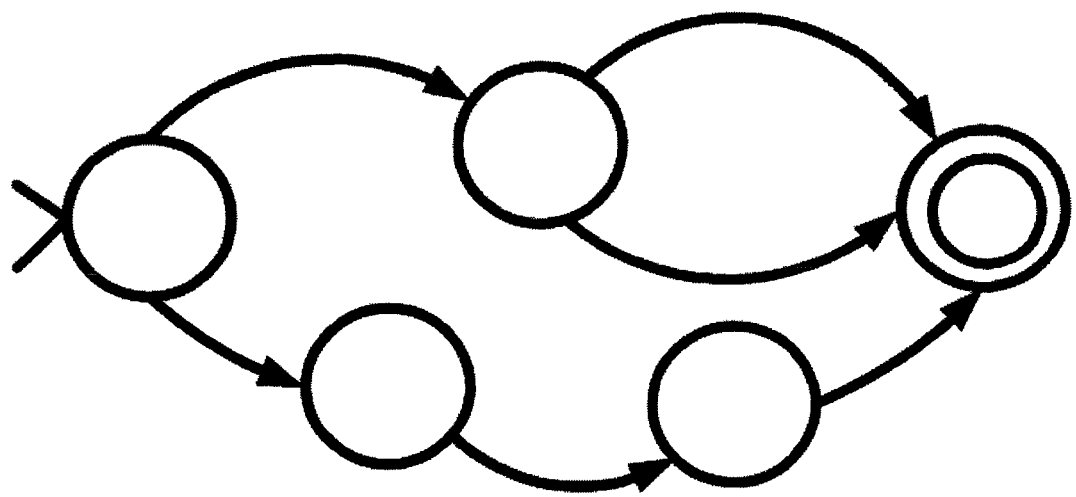
FIG. 9B is an exemplary schematic of exhaustive expansion task representation for voice-enabled dialog interaction with web pages, according to an aspect of the present disclosure.

At step 704 an abstract representation of the web form is generated by the form abstraction module 603. That is, web form elements and associated metadata, was well as their respective order and dependencies are represented, for example, as an abstract representation, e.g., an ATN. A basic dialog flow is represented as an abstract representation or ATN with a single state for each form element, including the label, type, possible values, help messages, transitions from browser ordering, and visual information. Value constraints and dependencies cause sub-ATNs (i.e., subtasks) to be generated. FIGS. 9A and 9B illustrate exemplary task representations, i.e., a two-state task representation and an exhaustive expansion task representation, respectively. The two-state task representation of FIG. 9A includes the start state and the accept state. The form elements' metadata (types, labels, values, and help messages) is stored in a global context, outside of the abstract representation or ATN. The dialog system repeatedly selects a form element at random, prompts for it using its label, and collects a value, until all the input form elements have values. Then, the transition to the accept state is executed. The exhaustive expansion task representation includes a state for each form element, and transitions following the browser ordering. Each state stores the metadata (type, label, values, and help messages) for its form element. Value constraints are represented as constraints on states, and dependencies are represented as sub-abstract representations or sub-ATNs.

In addition to extracting the labels, the type, name, id, absolute location, relative location, visual features including font, size, color, values or help messages, and browser ordering (i.e., tab ordering) are extracted and can be exported in XML, as illustrated in exemplary FIG. 10A. The information in FIG. 10A is used to generate a dialog flows corresponding to, for example, two state and optimized models. The fragment of an exemplary generated XML dialog corresponding to a two-state model is shown in FIG. 10B.

At step 706 dialog scripts are generated from the abstract representations by the dialog generation module 604. In an alternative example, if a dialog script has previously been generated and already exists for a particular web page, then an existing dialog script may be used for interaction with the user, rather than creating a new dialog script. At step 708, the user interacts with the web page 216 by voice input to populate the various fields of the web page 216 or form. As indicated above, spoken input of the user is converted into text and used to fill input areas. The user can also provide voice commands to have the cursor or other position indicator moved to a desired location. Additionally, text and other information displayed on the web page 216 or form is converted into speech and read to the user.

Figure 7B:
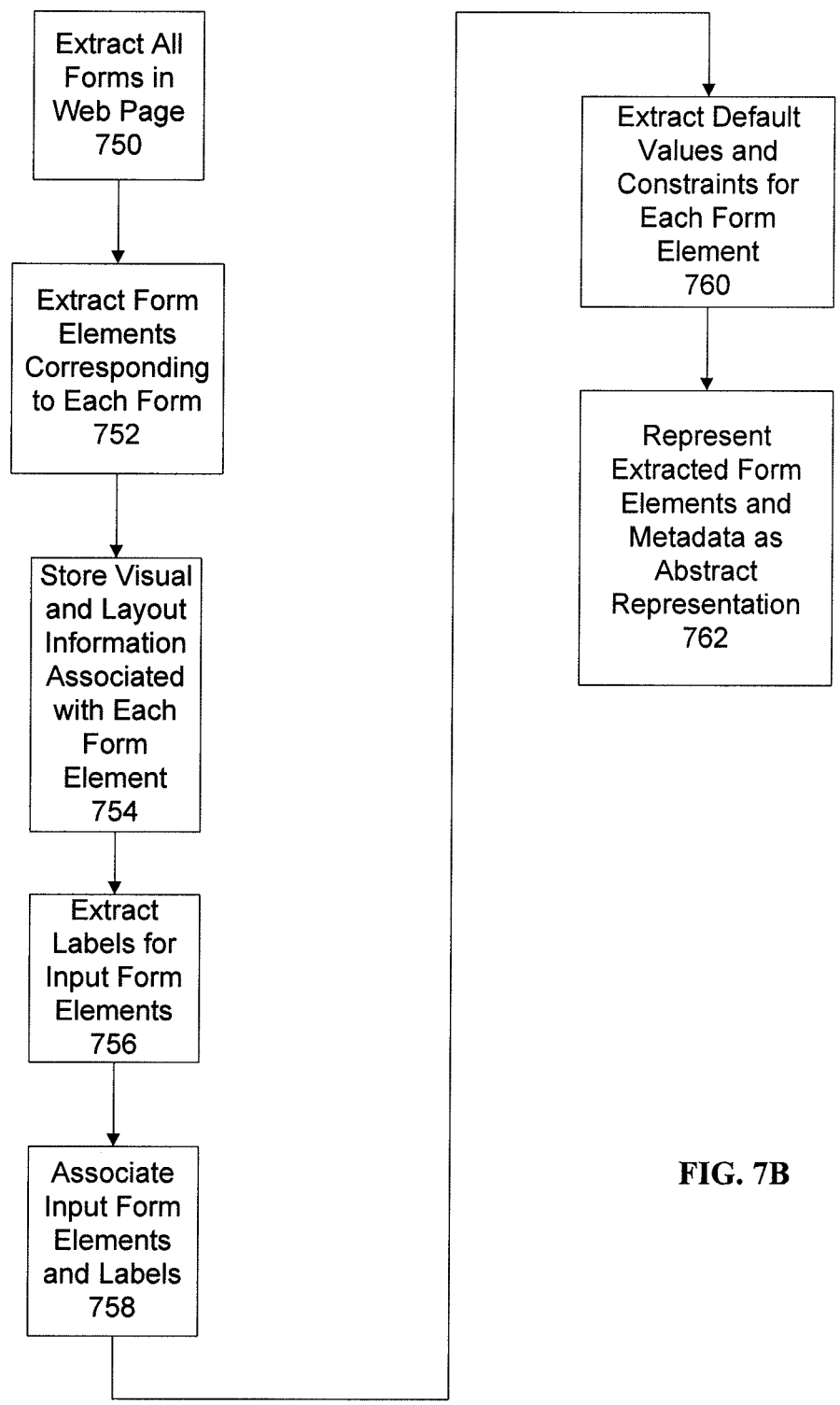
FIG. 7B is an exemplary flowchart diagram for voice-enabled dialog interaction with web pages, according to an aspect of the present disclosure.

FIG. 7B is an exemplary flowchart depicting the algorithm employed in steps 702 and 704 of FIG. 7A. At step 750 all of the forms in the web page 216 are extracted by the extraction module 602 using the information from the loading and parsing module 601. At step 752, the form elements corresponding to each form are extracted. Then, at step 754, the visual and layout information associated with each of the form elements are extracted. At step 756, labels for the input form elements are extracted. Then, visual and layout features are used to associate the input form elements and labels at step 758. At step 760, default values and constraints are extracted for each form element. Then, at step 762, the extracted form elements and metadata are represented in an abstract representation, for example, as an ATN.

Figure 11:
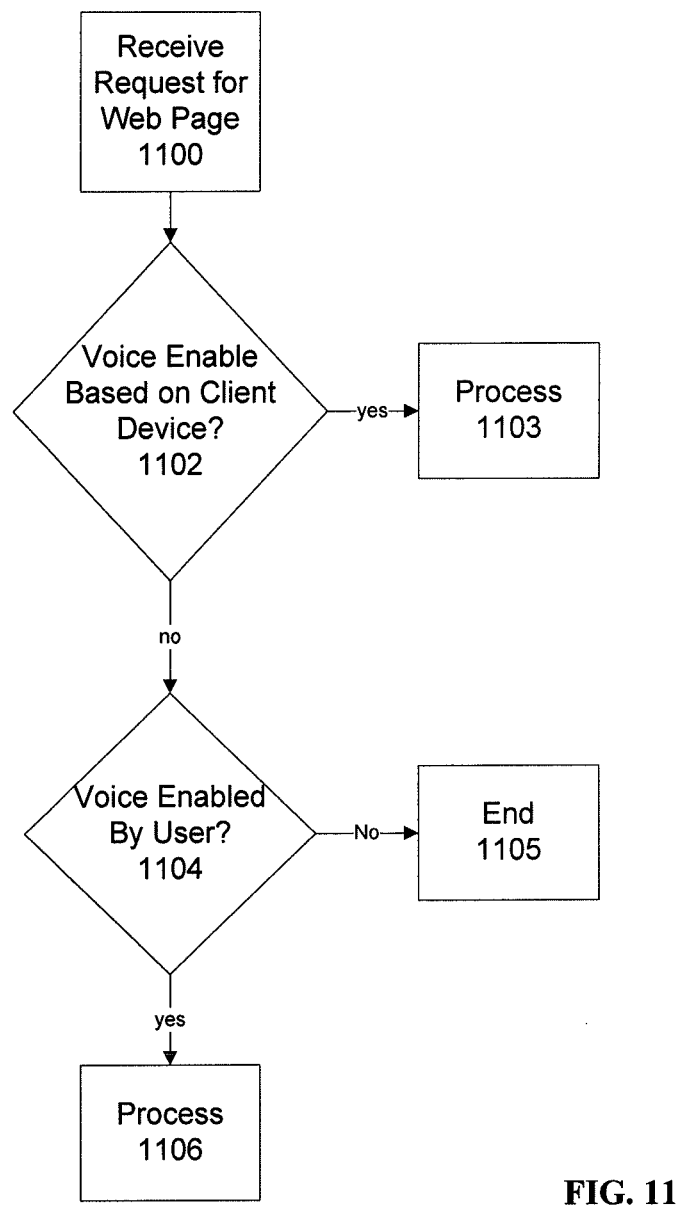
FIG. 11 is an exemplary flowchart diagram for voice-enabled dialog interaction with web pages, according to an aspect of the present disclosure.

FIG. 11 is an exemplary flowchart diagram, according to an aspect of the present disclosure. At step 1100, a request for a web page 216 is received, including an Internet address or URL, by a server or processor, in a manner as described above.

At step 1102, a determination of whether to provide a voice enabled web page 216 by processing the web page 216 and building the dialog is based upon client device 201. For example, if the client device 201 of the user does not have a keyboard, alphabetic input device, or displayable keypad, then voice enablement is automatically activated. If the communications device 201 of the user is has a small display screen (e.g., less than three inches by five inches, or other predetermined dimensions), then voice enablement is automatically activated. For example, if the user is on a smartphone or device without a keyboard or alphabetic input device, as ascertained via the user agent string in an HTTP address header as recognized by scripting in the plugin module 218, the web page is automatically processed and the web dialog is automatically generated and/or provided, by virtue of the plugin module 218. Alternatively, the plugin module 218 can detect the client device type by querying the web browser 203. As another example, the user may have a profile that indicates that they prefer voice enabled web pages, that is transmitted along with the HTTP request to view a web page, which is detected by scripting in the plugin module 218. If so, the web page is automatically processed and the web dialog is automatically generated and/or provided, by virtue of the plugin module 218 as discussed above. If a determination is made to enable voice interaction with web pages based upon the client device (step 1102—YES), control proceeds to step 1103, the web page is automatically processed, and the web voice dialog is automatically generated and/or provided in a manner discussed above. On the other hand, if a determination is made not to enable voice interaction with web page based on the client device 201, control proceeds to step 1104.

At step 1104, a determination is made as to whether the user of the client device has selected a voice-enable option to request voice enabled web pages. The user of a client device may specify a desire for voice enabled web pages, for example, as discussed above. That is, the user may activate a voice enable icon 555 on the web browser 203. If the client device is voice enabled by the user (step 1104=YES), then control proceeds to step 1106 where processing continues as described above. That is, the web page is processed, the dialog is built, and the user can interact with the web page via spoken dialog. If the user of the client device has not selected voice enabled option (step 1104—NO), then control proceeds to step 1105 and the user can interact with a conventional non-voice-enabled web page. It is understood that the logic may perform the determinations of steps 1102 and 1104 in any order, or that only one of the determinations may be performed, depending upon administrator preferences and company requirements.

The systems and elements described herein can include interpreters for HTML, VoiceXML (VXML), extensible hypertext markup language (XHTML), XHTML+VoiceXML (X+V), and other mark-up languages, and are adapted to execute scripts in such languages.

Accordingly, the present disclosure enables voice-enabled dialog interaction with web pages, without requiring any re-authoring or modification of the web pages, to automatically generate dialog flows used for interacting with users of the web pages. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

An example of how the interactive voice enabled web page system would be used is on a smart phone or other portable communications device including, but not limited to a PDA, tablet, cell phone, mobile phone, satellite phone, netbook, watch, smart watch, smart glasses, or any other devices having a relatively small display and/or keyboard, e.g., a display equal to or less than three inches by five inches. Many web pages are designed for large-screen devices and for users with full mobility and normal visual acuity. With such a small display, users experience difficulty viewing and/or entering information via traditional keypad entry. Physically and/or visually handicapped persons also can have difficulties typing or even seeing information in web forms, which may make entry impossible. The present interactive voice enabled system would allow users to effortlessly enter information. Further, many Internet enabled devices do not have keyboards, such as smart TVs or internet-enabled watches. Accordingly, the present interactive voice enabled system would allow users of Internet enabled devices without keyboards to more easily interact with web pages and forms.

For example, with respect to smart TV's, the user would use the voice enabled web page dialog system to populate web forms associated with the selection of streaming media, social networking, interactive advertising, gaming, etc. With respect to streaming media, the user would use the voice enabled web page dialog system to fill in a web form, or the equivalent thereof, with information to select media content, pay for media content, etc. With respect to social networking, the user would use the voice enabled web page dialog system to fill in a web form, or the equivalent thereof, with information to register, post information, share information, etc. With respect to interactive advertising, the user would use the voice enabled web page dialog system to fill in a web form, or the equivalent thereof, to request product or service information, interact with merchants, and make purchases. With respect to gaming, the user would use the voice enabled web page dialog system to fill in a web form, or the equivalent thereof, to download updates, participate in games, purchase games, etc.

Another example of how the voice enabled web page dialog with web pages would be used is with Internet enabled watches, i.e., watches configured to communicate over the Internet. Since a manual data entry device such as a keypad is very small on a watch, the user would use the voice enabled web page dialog system to conduct searches on search engines and populate web forms. Additionally, as another example, the user of the watch would use an application on the watch that provides the time in other geographic locations, e.g., the user would speak "What time is it in Rome, Italy". In response, the answer would be provided to the user either on the watch display or via spoken output using speech recognition processes.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission, HTML, VoiceXML, XHTML, XHTML+VoiceXML (X+V), VoIP, and SIP represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of enabling voice interaction with a web page, comprising:
receiving, at a processor, an Internet address of the web page, the web page including an area with which a user of a client device can specify information;
determining that the client device does not have an alphabetic input device and a displayable keypad;
loading the web page using the Internet address;
extracting a task structure of the web page;
generating a representation of the web page to facilitate the voice interaction with the web page; and
providing a dialog script based on the representation to provide the voice interaction with the user,
wherein spoken information of the user is converted into text and the text is inserted into the area.

2. The method of claim 1, further comprising:
extracting forms, form constraints, and dependencies from the web page using a browser object model and a document object model.

3. The method of claim 1, further comprising:
generating a browser object model of the web page.

4. The method of claim 3, wherein the browser object model comprises a state of hypertext markup language elements as the hypertext markup language elements would appear in a web browser.

5. The method of claim 3, further comprising:
generating a document object model of the web page.

6. The method of claim 5, wherein the document object model comprises a tree of hypertext markup language elements.

7. The method of claim 1, further comprising:
detecting that the user of the client device prefers to specify information in the web page by voice.

8. The method of claim 1, further comprising:
determining that the client device is a portable communications device.

9. The method of claim 8, wherein the determining that the client device is a portable communications device is based upon a received user agent string in a hypertext transfer protocol address header received with the Internet address.

10. A system for enabling voice interaction with a web page, comprising:
a processor;
a memory that stores executable instructions that, when executed by the processor, cause the processor to perform operations comprising:
receiving an Internet address of the web page, the web page including an area with which a user of a client device can specify information;
determining that the client device does not have an alphabetic input device and a displayable keypad;
loading the web page using the Internet address;
extracting a task structure of the web page;
generating a representation of the web page to facilitate the voice interaction with the web page; and
providing a dialog script based on the representation to provide the voice interaction with the user, and
wherein spoken information of the user is converted into text and the text is inserted into the area.

11. A non-transitory computer readable storage medium encoded with an executable computer program that enables voice interaction with a web page and that, when executed by a processor, causes the processor to perform operations comprising:
receiving an Internet address of the web page, the web page including an area with which a user of a client device can specify information;

determining that the client device does not have an alphabetic input device and a displayable keypad;
loading the web page using the Internet address;
extracting a task structure of the web page;
generating a representation of the web page to facilitate the voice interaction with the web page; and
providing a dialog script based on the representation to provide the voice interaction with the user,
wherein spoken information of the user is converted into text and the text is inserted into the area.

12. The non-transitory computer readable storage medium of claim 11, wherein the operations further comprise:
extracting forms, form constraints, and dependencies from the web page using a browser object model and a document object model.

13. The non-transitory computer readable storage medium of claim 11, wherein the operations further comprise:
generating a browser object model of the web page.

14. The non-transitory computer readable storage medium of claim 13, wherein the browser object model comprises a state of hypertext markup language elements as the hypertext markup language elements would appear in a web browser.

15. The non-transitory computer readable storage medium of claim 13, wherein the operations further comprise:
generating a document object model of the web page.

16. The non-transitory computer readable storage medium of claim 11, wherein the operations further comprise:
detecting that the user of the client device prefers to specify information in the web page by voice.

17. The non-transitory computer readable storage medium of claim 11, wherein the operations further comprise:
determining that the client device is a portable communications device.

18. The non-transitory computer readable storage medium of claim 17, wherein the determining that the client device is a portable communications device is based upon a received user agent string in a hypertext transfer protocol address header received with the Internet address.

* * * * *